United States Patent
Knepper

(10) Patent No.: US 10,320,222 B2
(45) Date of Patent: *Jun. 11, 2019

(54) SYSTEM AND METHOD FOR A MULTI-COIL WIRELESS POWER TRANSFER

(71) Applicant: Dell Products L.P., Round Rock, TX (US)

(72) Inventor: Lawrence E. Knepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/414,018

(22) Filed: Jan. 24, 2017

(65) Prior Publication Data

US 2017/0133876 A1    May 11, 2017

Related U.S. Application Data

(63) Continuation of application No. 14/549,295, filed on Nov. 20, 2014, now Pat. No. 9,590,447.

(51) Int. Cl.
| | |
|---|---|
| *H02J 7/00* | (2006.01) |
| *H02J 7/02* | (2016.01) |
| *H04B 5/00* | (2006.01) |
| *H02J 50/10* | (2016.01) |
| *H02J 50/80* | (2016.01) |
| *H02J 50/90* | (2016.01) |

(52) U.S. Cl.
CPC ............ *H02J 7/025* (2013.01); *H02J 7/0052* (2013.01); *H02J 50/10* (2016.02); *H02J 50/80* (2016.02); *H02J 50/90* (2016.02); *H04B 5/0037* (2013.01); *H04B 5/0081* (2013.01)

(58) Field of Classification Search
CPC ................................ H02J 5/0051; H02J 7/025
See application file for complete search history.

(56) References Cited

U.S. PATENT DOCUMENTS

| | | | |
|---|---|---|---|
| 9,590,447 B2* | 3/2017 | Knepper | ................. H02J 7/025 |
| 2013/0285606 A1 | 10/2013 | Ben-Shalom | |
| 2014/0002014 A1 | 2/2014 | Sultenfuss et al. | |

OTHER PUBLICATIONS

"A4WP Wireless Power Transfer System Baseline System Specification (BSS) A4WPS-0001 v1.2" at www.a4wp.org; 98 pages, Jan. 29, 2014.

* cited by examiner

*Primary Examiner* — Drew A Dunn
*Assistant Examiner* — Sailesh Thapa
(74) *Attorney, Agent, or Firm* — Baker Botts L.L.P.

(57) ABSTRACT

Systems and methods are disclosed for multi-coil wireless power transfer. The system includes a first transmitting coil disposed within a lower portion of a wireless charger, and a second transmitting coil disposed within a side portion of the wireless charger. The system further includes a communications module configured to receive a signal from an information handling system. The information handling system includes a receiving coil. The system additionally includes a transmit module configured to determine an orientation of the receiving coil, and provide a first current to the first transmitting coil and a second current to the second transmitting coil based on the orientation of the receiving coil.

20 Claims, 2 Drawing Sheets

FIG. 1

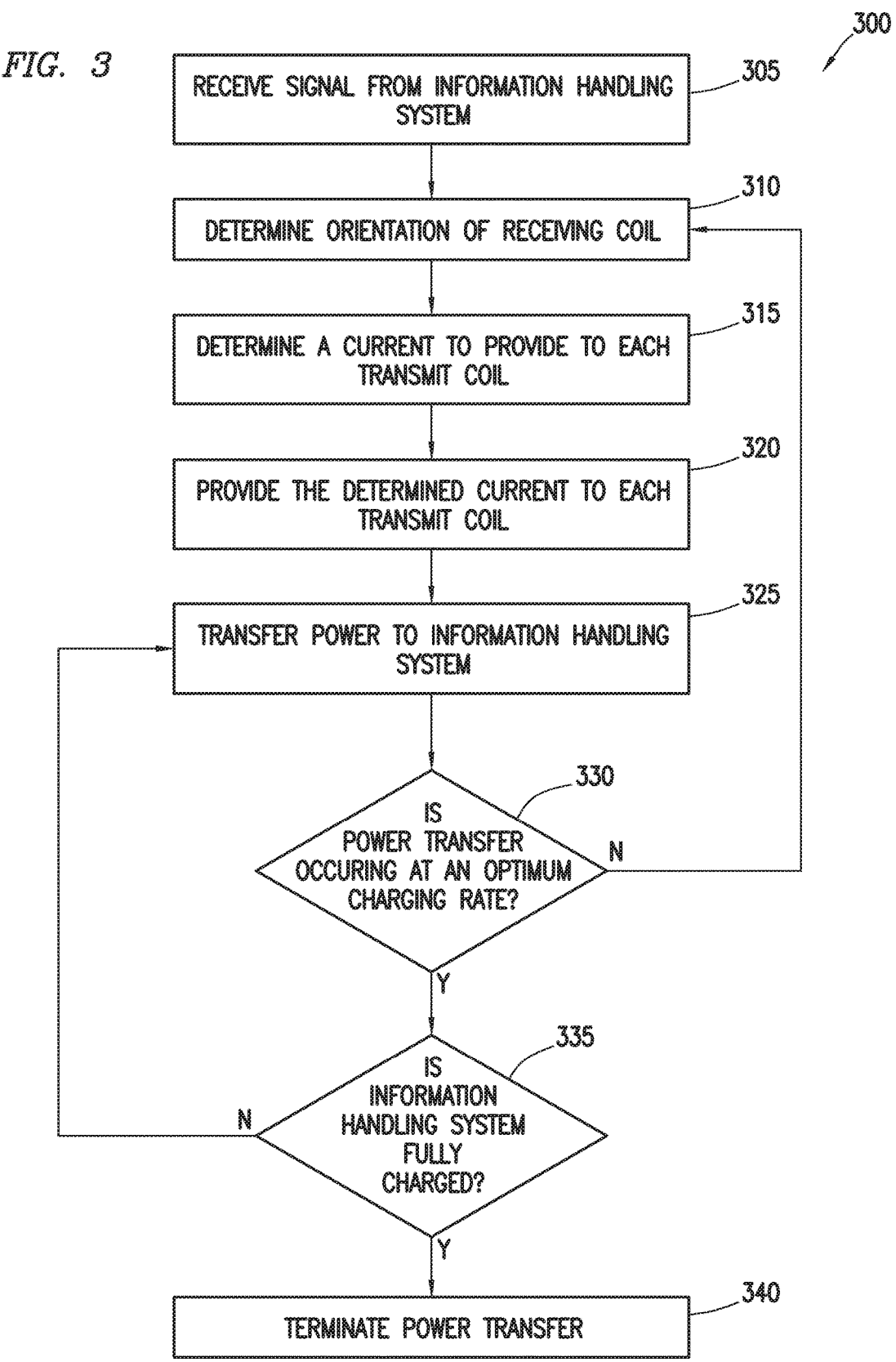

SYSTEM AND METHOD FOR A MULTI-COIL WIRELESS POWER TRANSFER

RELATED APPLICATIONS

This application is a continuation of U.S. patent application Ser. No. 14/549,295 filed Nov. 20, 2014, the contents of which is incorporated by reference herein.

TECHNICAL FIELD

This disclosure relates generally to information handling systems and, more particularly, to a system and method for multi-coil wireless power transfer for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A wireless power transfer system typically includes a wireless charging pad on to which a device may be placed for charging. The device can communicate with the charging pad to indicate that the device is available to receive power. The wireless power transfer system can then wirelessly transmit power to the device.

SUMMARY

In accordance with an embodiment of the present disclosure, a wireless charging system is disclosed. The system includes a first transmitting coil disposed within a lower portion of a wireless charger, and a second transmitting coil disposed within a side portion of the wireless charger. The system further includes a communications module configured to receive a signal from an information handling system. The information handling system includes a receiving coil. The system additionally includes a transmit module configured to determine an orientation of the receiving coil, and provide a first current to the first transmitting coil and a second current to the second transmitting coil based on the orientation of the receiving coil.

In accordance with another embodiment of the present disclosure, method for wireless charging is disclosed. The method includes receiving a signal from an information handling system. The information handling system includes a receiving coil. The method further includes determining an orientation of the receiving coil, and providing a first current to a first transmitting coil and a second current to a second transmitting coil based on the orientation of the receiving coil. The first transmitting coil is disposed within a lower portion of a wireless charger, and the second transmitting coil is disposed within a side portion of the wireless charger.

In accordance with another embodiment of the present disclosure, non-transitory machine-readable storage medium encoded with instructions executable by one or more processors to perform one or more operations is disclosed. The operations include receiving a signal from an information handling system. The information handling system includes a receiving coil. The operations further include determining an orientation of the receiving coil, and providing a first current to a first transmitting coil and a second current to a second transmitting coil based on the orientation of the receiving coil. The first transmitting coil is disposed within a lower portion of a wireless charger, and the second transmitting coil is disposed within a side portion of the wireless charger.

BRIEF DESCRIPTION OF THE DRAWINGS

For a more complete understanding of the present disclosure and its features and advantages, reference is now made to the following description, taken in conjunction with the accompanying drawings, which may include drawings that are not to scale and wherein like reference numbers indicate like features, in which:

FIG. 3 illustrates a flowchart of an example method for wireless power transfer in accordance with some embodiments of the present disclosure.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
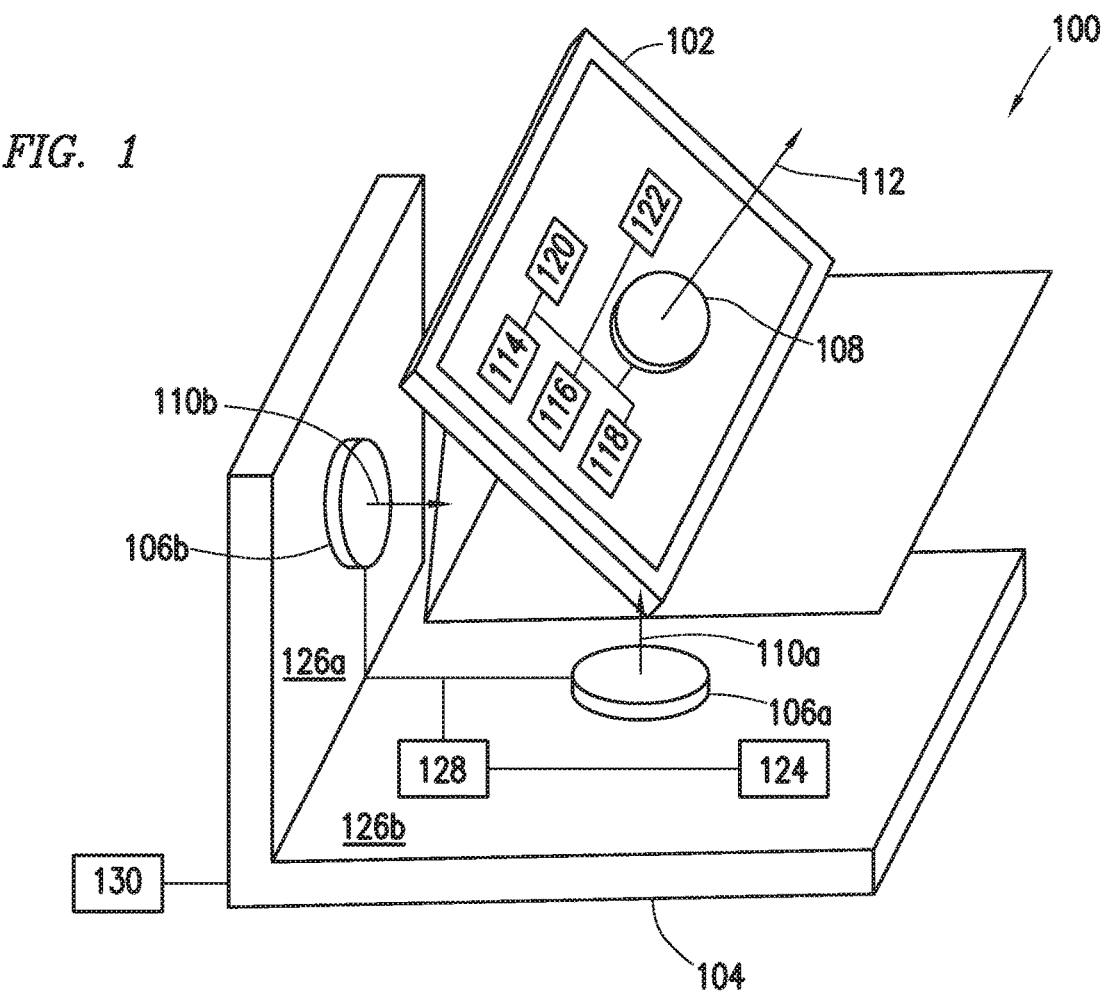
FIG. 1 illustrates an exemplary diagram of a wireless power transfer system in accordance with some embodiments of the present disclosure.
Figure 2:
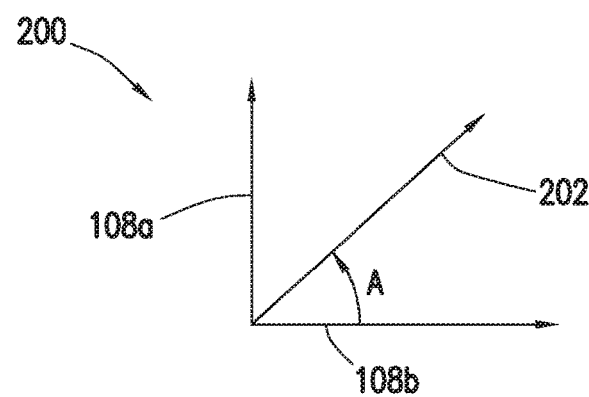
FIG. 2 illustrates an exemplary plot of a resultant flux vector in accordance with some embodiments of the present disclosure.

Embodiments of the present disclosure and its advantages are best understood by referring to FIGS. 1-3 of the drawings, like numerals being used for like and corresponding parts of the various drawings.

FIG. 1 illustrates an exemplary diagram of wireless power transfer system 100 in accordance with some embodiments of the present disclosure. In some embodiments, system 100 may include information handling system 102 and wireless charger 104. Wireless power transfer system 100 may be an inductively coupled system. In an inductively coupled system, a transmitter coil and a receiver coil form a system of magnetically coupled inductors. A magnetic field is produced in the transmitter coil by an alternating current. The magnetic field induces a voltage in the receiver coil. The voltage may be used to power information handling system 102 or charge a power source, e.g., a battery.

The efficiency of the power transfer in an inductively coupled system may depend on the coupling between the coils. Coupling is based on the distance between the coils, the shape and size of the coils, and the angle between the coils. Because the magnetic flux vector is directed through the center of a coil, efficiency may be maximized when the coils are aligned coaxially, e.g., parallel, to each other such that the magnetic flux vectors are substantially aligned. Efficiency may be at a minimum when the coils are at a right angle, e.g., perpendicular, to each other. However, in some applications, physically aligning the coils coaxially may not be practical. Thus, in some embodiments, multiple coils may be utilized to synthesize a magnetic flux vector that mimics a transmitter coil that is coaxial to a receiving coil.

In some embodiments, information handling system 102 may include a portion that includes receiving coil 108 oriented such that receiving coil 108 is not oriented coaxially with any of transmitting coils 106a and 106b (collectively, "transmitting coils 106"). In the current example, receiving coil 108 is oriented at an angle that is not horizontal, which would be aligned with transmitting coil 106a, and is not vertical, which would be aligned with transmitting coil 106b. For example, information handling system 102 may be tablet attached to a folio stand, a 2-in-1 configuration that includes a tablet attached to a keyboard base, or any other similar configuration.

In some embodiments, wireless charger 104 may include one or more transmitting coils 106. Transmitting coils 106 may include a winding without a core or may include a core that supports the winding that is mounted or wrapped around the core. In such a case, the core may be composed of a material that may have a high magnetic permeability, such as a permanent magnet. For example, the core may be composed of magnetic transition metals and transition metal alloys, particularly annealed (soft) iron or a permalloy (sometimes referred to as a "MuMetal"), which are a family of Ni—Fe—Mo alloys, ferrite, or any other alloy or combination of alloys that exhibits ferromagnetic properties. The winding may be wrapped directly onto the core or may be wrapped on a bobbin. In some embodiments, the winding may be a magnetic wire that includes an insulator and a conductor. For example, the winding may be varnish coated round copper wire, square silver wire, copper drawn wire with a thin dielectric coating, or any other suitable material. Transmitting coils 106 generate voltage based on the number of turns of the coil, the diameter of the coil, and the rate of change of magnetic flux over time inside the diameter of transmitting coils 106. Thus, transmitting coils 106 may have a larger diameter than receiving coil 108.

As current flows through the winding, transmitting coils 106a and 106b generate magnetic flux vectors 110a and 110b (collectively "flux vectors 110"). Flux vectors are generated in a direction normal to the coils. The strength of flux vectors 108 may be based on the amount of current that is driven through transmitting coils 106 among other factors. The direction of a respective flux vector 110 is based on the orientation of the respective transmitting coil 106. However, the direction of flux vectors 110 may not align with the orientation of target flux vector 112 of receiving coil 108. Because of this misalignment, the efficiency of power transfer may be compromised and may not be optimal. Thus, in some embodiments, aligning a resultant flux vector by the synthesis of flux vectors 110a and 110b with target flux vector 112 may improve power transfer from wireless charger 104 to information handling system 102.

As such, wireless power transfer with individual flux vectors 108 synthesized into a resultant flux vector enables simpler and more efficient methods and systems to charge information handling systems. Further, charging of information handling systems may be accomplished without the need for power cords or other charging methods. In particular, wireless power transfer of the present disclosure allows the use of a wireless pad or basket into which one or more varied information handling systems may be placed to charge. As will be described in further detail, the present disclosure includes methods and systems for improved inductive coupling for wireless chargers and information handling systems.

Information handling system 102 may generally be operable to receive data from, and/or transmit data to, other information handling systems 102 and wireless charger 104. Information handling system 102 may be a laptop computer, a desktop computer, a tablet computer, a personal digital assistant (PDA), a mobile phone, or any similar device. For example, information handling system 102 shown in FIG. 1 is a tablet attached to a folio. In some embodiments, information handling system 102 may include processor system 114, user interface 116, memory system 118, communications system 120, and/or power system 122.

Processor system 114 may include one or more processors, and may comprise any system, device, or apparatus operable to interpret and/or execute program instructions and/or process data. Processor system 114 may include, without limitation, a microprocessor, microcontroller, digital signal processor (DSP), application specific integrated circuit (ASIC), or any other digital or analog circuitry configured to interpret and/or execute program instructions and/or process data. In some embodiments, processor system 114 may interpret and/or execute program instructions and/or process data stored locally (e.g., in memory system 118 and/or another component of information handling system 102). In some embodiments, processor system 114 may interpret and/or execute program instructions and/or process data stored remotely.

User interface 116 may be communicatively coupled to processor 114. User interface 116 may include any instrumentality or aggregation of instrumentalities by which a user may interact with information handling system 102. User interface 116 may comprise a system, device, or apparatus generally operable to receive and/or transmit data to/from/ within information handling system 102. For example, user interface 116 may permit a user to input data and/or instructions into information handling system 102 (e.g., via a keyboard, pointing device, touch screen, and/or other suitable means), and/or otherwise manipulate information handling system 102 and its associated components. User interface 116 may also permit information handling system 102 to communicate data to a user, e.g., by means of a display device. For example, user interface 116 may include a touch panel that may include circuitry for enabling touch functionality in conjunction with a display.

Memory system 118 may be communicatively coupled to processor system 114. Memory system 118 may comprise any system, device, or apparatus operable to retain program instructions or data for a period of time (e.g., computer-readable media). Memory system 118 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 may be turned off. Memory system 118 may include one or more mass storage devices. Mass storage devices may include one or more hard disk drives (HDDs), magnetic tape libraries, optical disk drives, magneto-optical disk drives, compact disk drives, compact disk arrays, disk array controllers, solid state drives (SSDs), and/or any computer-readable medium operable to store data.

Power system 120 may be communicatively coupled to processor system 114 and may include any instrumentality or aggregation of instrumentalities by which power is supplied to information handling system 102. In some embodiments, power system 120 may be an internal power supply such as a battery. In some embodiments, power system 120 may be an external power supply or adapter for providing power to a portable information handling system such as a notebook, personal display assistant (PDA), tablet, and/or any other portable device. The external power supply may also have a power cable coupling the external power supply to the information handling system 102. Furthermore, power system 120 may include an alternating current to direct current (AC/DC) converter, a DC/DC converter, and/or any other suitable components.

Communications system 122 may be communicatively coupled to processor system 114 and may include any instrumentality or aggregation of instrumentalities configured to communicatively couple information handling system 102 to communicate information with wireless charger 104. Communications system 122 may include an antenna device, a Bluetooth signal enabled device, a WiFi signal enabled device, and/or other suitable device. Communications system 122 may also include identification information for information handling system 102. For example, communications module 122 may include a product Electronic Data Identification (EDID) tag. Communications system 122 may be utilized to indicate the presence and/or identity of information handling system 102 to communication module 124 of wireless charger 104. For example, when information handling system 102 is placed within range of communication module 124, the product EDID tag may transmit a presence signal, or chirp, to indicate that information handling system 102 is within range of the wireless charger 104. The presence signal may be a repeating pulse that may be received by communication module 124. Further, communications system 122 may indicate a location and orientation of receiving coil 108 and/or target flux vector 112.

Wireless charger 104 may be operable to receive and convert electrical power to a magnetic field to transmit power inductively to one or more information handling systems 102. Wireless charger 104 may have one or more surfaces 126a and 126b (collectively "surfaces 126"). Surface 126a may be referred to as a lower portion of wireless charger 104. Surface 126b may be referred to as a side portion of wireless charger 104. Surfaces 126 may be constructed of plastic or any other suitable material that allows inductive coupling of transmitting coils 106 and receiving coil 108. Although shown with two surfaces 126a and 126b, additional surfaces 126 may be included in some embodiments. For example, multiple surfaces 126 may be configured to resemble a basket or other container that may be able to hold multiple information handling systems 102. Further, although shown with surfaces 126a and 126b substantially perpendicular with respect to each other, a surface 126 may be oriented in at any angle with respect to other surfaces 126. Wireless charger 104 may include communications module 124, transmit module 128, and/or power source 130.

Communications module 124 may be communicatively coupled to transmit module 128. Communications module 124 may include any instrumentality or aggregation of instrumentalities configured to communicatively couple wireless charger 104 to communicate information with information handling system 102. Communications module 124 may include an antenna device, a Bluetooth signal enabled device, a WiFi signal enabled device, and/or other suitable devices. Communications module 124 may be utilized to receive a signal that indicates the presence and/or identity of information handling system 102. For example, when information handling system 102 is placed within range of communications module 124, the product EDID tag may transmit a presence signal, or chirp, that is received by communications module 124 to indicate that information handling system 102 is within range of the wireless charger 104. Further, communications module 124 may be utilized to receive orientation information relating to any receiving coils 108 included in information handling system 102. For example, communications module 124 may receive information indicating the angle of orientation of receiving coil 108. For example, a Bluetooth link may be capable of transmitting the angle or orientation of information handling system 102 and thus receiving coil 108.

Transmit module 128 may be communicatively coupled to transmit coils 106 and communications module 124. Transmit module 128 may include any instrumentality, aggregation of instrumentalities, or circuitry configured to receive information from communications module 124 and control current to transmit coils 106. Transmit module 128 may include one or more processors or any system, device, or apparatus operable to interpret and/or execute program instructions and/or process data. Transmit module 128 may include, without limitation, a microprocessor, microcontroller, DSP, ASIC, or any other digital or analog circuitry configured to interpret and/or execute program instructions and/or process data. In some embodiments transmit module 128 may interpret and/or execute program instructions and/ or process data stored in a memory. Transmit module 128 may further include any system, device, or apparatus operable to retain program instructions or data for a period of time (e.g., computer-readable media). Transmit module 128 may include RAM, EEPROM, a PCMCIA card, flash memory, magnetic storage, opto-magnetic storage, or any suitable selection and/or array of volatile or non-volatile memory that retains data after power to wireless charger 104 may be turned off.

Power source 130 may be communicatively coupled to transmit module 128 and may include any instrumentality or aggregation of instrumentalities by which power is supplied to wireless charger 104. In some embodiments, power source 130 may be an internal power supply such as a battery. In some embodiments, power source 130 may be an external power supply, power cord, or adapter for providing power to wireless charger 104. The external power supply may also have a power cable coupling the external power supply to wireless charger 104. Furthermore, power source 130 may include an alternating current to direct current (AC/DC) converter, a DC/DC converter, and/or any other suitable components.

FIG. 2 illustrates an exemplary plot 200 of resultant flux vector 202 in accordance with some embodiments of the present disclosure. Transmitting coils 106a and 106b, shown with reference to FIG. 1, may be driven by transmit module 128 in phase, but with varied amplitudes such that flux vectors 108a and 108b may be at different values. Combining the flux vectors 108a and 108b may generate a resulting flux vector 202 that is directed at an angle, A, from the direction of flux vector 108b. Angle A may be varied to align with the orientation of the target flux vector of the receiving device, e.g., target flux vector 112 of receiving coil 108 discussed with reference to FIG. 1. Angle A may be varied by transmit module 128 by adjusting the amplitudes of current driven in transmitting coils 106a and 106b that result in flux vectors 108a and 108b, respectively. Further, power transfer between wireless charger 104 and information handling system 102 may decline as a function of cos A as angle A increases.

In some embodiments, wireless charger 104 may be capable of concurrent charging of multiple information handling systems 102. In such a case, transmit module 128 may rotate the orientation of resultant flux vector 202 such that inductive coupling is optimized for one information handling system 102 for a specified period of time and then optimized for a different information handling system 102 for the same or a different specified period of time.

FIG. 3 illustrates a flowchart of an example method 300 for wireless power transfer in accordance with some embodiments of the present disclosure. The steps of method 300 may be performed by various computer programs, models or any combination thereof. The programs and models may include instructions stored on a computer-readable medium that are operable to perform, when executed, one or more of the steps described below. The computer-readable medium may include any system, apparatus or device configured to store and/or retrieve programs or instructions such as a microprocessor, a memory, a disk controller, a compact disc, flash memory or any other suitable device. The programs and models may be configured to direct a processor or other suitable unit to retrieve and/or execute the instructions from the computer-readable medium. For example, method 300 may be executed by wireless charger 104 and/or other suitable source. For illustrative purposes, method 300 may be described with respect to wireless power transfer system 100 of FIG. 1; however, method 300 may be used for wireless power transfer systems of any suitable configuration.

At step 305, the wireless charger receives a signal from an information handling system. For example, with reference to FIG. 1, communications module 124 may receive a chirp or other notification from communications system 122 located in information handling system 102. Receiving the signal may indicate that information handling system 102 is within range of wireless charger 104 such that information handling system 102 may be charged.

At step 310, the wireless charger determines the orientation of the receiving coil. For example, communications system 122 or other suitable device may communicate the orientation of receiving coil 108 located in information handling system 110. Communications module 124 may receive the orientation information and transmit or otherwise convey the information to transmit module 128. Orientation information may include distance between receiving coil 108 and transmitting coils 106, angle from horizontal at which receiving coil 108 is oriented, or other suitable information.

At step 315, the wireless charger determines a current to provide to each transmit coil. Based upon the orientation of receiving coil 108, transmit module 128 may determine the direction of target flux vector 112. Transmit module 128 may also determine the amount of current to supply to each of transmitting coils 106 such that resultant flux vector 202 is directed in approximately the same direction as target flux vector 112. For example, by adjusting the amplitudes of current driven in transmitting coils 106a and 106b that result in flux vectors 110a and 110b, the direction of resulting flux vector 112 may be modified.

At step 320, the wireless charger provides the determined current to each transmit coil. For example, once the current to be supplied to each transmitting coil 106 is determined, transmit module 128 may supply the determined current to each transmit coil.

At step 325, the wireless charger transfers power to the information handling system. For example, inductive power transfer may occur between wireless charger 104 and information handling system 102 such that information handling system 102 is charged.

At step 330, the wireless charger determines if the power transfer is occurring at an optimum charging rate. For example, wireless charger 104 may reevaluate the orientation of receiving coil 108, and based on the reevaluation determine that the power transfer could be improved or is not at the optimum charging rate. In some embodiments, the wireless charger may adjust current to one or multiple transmitting coils 106 and determine if the power transfer rate increased or decreased. If the power transfer rate increased, the wireless charger may make another adjustment to one or multiple transmitting coils 106, and again determine if the power transfer rate increased or decreased. The wireless charger may continue such iterative improvement until the power transfer rate begins to decrease. In such a manner, the wireless charger may determine the optimum currents to supply to transmitting coils 106 to maximize power transfer. Thus, the optimum charging rate may be the rate at which the wireless charger determines the power transfer is optimized. If power transfer is occurring at the optimum charging rate, method 300 proceeds to step 335. If power transfer is not occurring at the optimum charging rate, method 300 returns to step 310.

At step 335, the wireless charger determines if the information handling system is fully charged. If the information handling system is fully charged, method 300 proceeds to step 340 where the transmit module terminates power transfer. If the information handling system is not fully charged, method 300 returns to step 325.

Modifications, additions, or omissions may be made to method 300 without departing from the scope of the present disclosure and invention. For example, the order of the steps may be performed in a different manner than that described and some steps may be performed at the same time. For example, step 310 and step 320 may be performed simultaneously. Additionally, each individual step may include additional steps without departing from the scope of the present disclosure. For example, step 315 may be performed before or after step 310 without departing from the scope of the present disclosure.

Although the present invention and its advantages have been described in detail, it should be understood that various changes, substitutions and alternations can be made herein without departing from the spirit and scope of the invention which is solely defined by the following claims.

What is claimed is:

1. A wireless charging system comprising:
a first transmitting coil disposed within a lower portion of a wireless charger;
a second transmitting coil disposed within a side portion of the wireless charger;
a communications module configured to receive a signal from an information handling system, the information handling system including a receiving coil; and
a processor configured to:
determine an orientation of the receiving coil, wherein the receiving coil is not oriented coaxially with the first transmitting coil or the second transmitting coil;
determine a target flux vector based on the orientation of the receiving coil; and
determine a first current to provide to the first transmitting coil and a second current to provide to the second transmitting coil based on the target flux vector.

2. The system of claim 1, wherein the processor is further configured to provide the first current to the first transmitting coil and the second current to the second transmitting coil.

3. The system of claim 2, wherein the processor is further configured to provide the first current and the second current based on a direction of a resultant flux vector approximating the direction of the target flux vector.

4. The system of claim 3, wherein the wireless charger is configured to transfer power to the information handling system.

5. The system of claim 4, wherein the processor is further configured to determine if the power transfer is occurring at an optimum charging rate.

6. The system of claim 5, wherein the processor is further configured to adjust the first current based on a changed direction of the target flux vector.

7. The system of claim 1, wherein the side portion is configured such that the second transmitting coil is oriented substantially perpendicular to the first transmitting coil.

8. The system of claim 1, wherein the signal includes identification information of the information handling system.

9. A method for wireless charging comprising:
receiving a signal from an information handling system, the information handling system including a receiving coil;
determining an orientation of the receiving coil, wherein the receiving coil is not oriented coaxially with a first transmitting coil disposed within a lower portion of a wireless charger or a second transmitting coil disposed within a side portion of the wireless charger;
determining a target flux vector based on the orientation of the receiving coil; and
determining a first current to provide to the first transmitting coil and a second current to provide to the second transmitting coil based on the target flux vector.

10. The method of claim 9, further comprising wherein providing the first current to the first transmitting coil and the second current to the second transmitting coil.

11. The method of claim 10, wherein providing the first current and the second current is further based on a direction of a resultant flux vector approximating the direction of the target flux vector.

12. The method of claim 11, further comprising transferring power to the information handling system.

13. The method of claim 12, further comprising determining if the power transfer is occurring at an optimum charging rate.

14. The method of claim 13, further comprising adjusting the first current based on a changed direction of the target flux vector.

15. The method of claim 9, wherein the side portion is configured such the second transmitting coil is oriented substantially perpendicular to the first transmitting coil.

16. The method of claim 9, wherein the signal includes identification information of the information handling system.

17. A non-transitory machine-readable storage medium encoded with instructions executable by one or more processors to perform one or more operations, the one or more operations comprising:
receiving a signal from an information handling system, the information handling system including a receiving coil;
determining an orientation of the receiving coil, wherein the receiving coil is not oriented coaxially with a first transmitting coil disposed within a lower portion of a wireless charger or a second transmitting coil disposed within a side portion of the wireless charger;
determining a target flux vector based on the orientation of the receiving coil; and
determining a first current to provide to the first transmitting coil and a second current to provide to the second transmitting coil based on the target flux vector.

18. The non-transitory machine-readable storage medium of claim 17, further comprising providing the first current to a first transmitting coil and the second current to a second transmitting coil.

19. The non-transitory machine-readable storage medium of claim 18, wherein providing the first current and the second current is further based on a direction of a resultant flux vector approximating the direction of the target flux vector.

20. The non-transitory machine-readable storage medium of claim 19, further comprising transferring power to the information handling system.

* * * * *